(12) United States Patent
Gottschalk et al.

(10) Patent No.: US 12,706,736 B2
(45) Date of Patent: Aug. 11, 2026

(54) PREPARATION OF A CONTROL DEVICE FOR SECURE COMMUNICATION

(71) Applicant: BSH Hausgeräte GmbH, Munich (DE)

(72) Inventors: Richard Gottschalk, Regensburg (DE); Andreas Rehberg, Nittendorf (DE)

(73) Assignee: BSH Hausgeräte GmbH, Munich (DE)

( * ) Notice: Subject to any disclaimer, the term of this patent is extended or adjusted under 35 U.S.C. 154(b) by 202 days.

(21) Appl. No.: 18/008,241

(22) PCT Filed: May 25, 2021

(86) PCT No.: PCT/EP2021/063842
§ 371 (c)(1),
(2) Date: Dec. 5, 2022

(87) PCT Pub. No.: WO2021/249761
PCT Pub. Date: Dec. 16, 2021

(65) Prior Publication Data

US 2023/0208621 A1 Jun. 29, 2023

(30) Foreign Application Priority Data

Jun. 8, 2020 (DE) ..................... 10 2020 207 157.8

(51) Int. Cl.
*H04L 9/08* (2006.01)
*H04L 9/32* (2006.01)

(52) U.S. Cl.
CPC .......... *H04L 9/0825* (2013.01); *H04L 9/0861* (2013.01); *H04L 9/3263* (2013.01)

(58) Field of Classification Search
None
See application file for complete search history.

(56) References Cited

U.S. PATENT DOCUMENTS

| | | | | |
|---|---|---|---|---|
| 2007/0223706 | A1* | 9/2007 | Gantman .............. | G06F 21/602 380/286 |
| 2018/0285602 | A1* | 10/2018 | Mersh ..................... | G06F 21/33 |
| 2018/0375649 | A1 | 12/2018 | Goller et al. | |
| 2019/0020633 | A1* | 1/2019 | Leavy ....................... | H04L 9/14 |
| 2019/0253249 | A1* | 8/2019 | Meng .................. | G06Q 20/382 |

(Continued)

FOREIGN PATENT DOCUMENTS

| | | | |
|---|---|---|---|
| CA | 3004954 | A1 | 11/2018 |
| CN | 2609069 | Y | 3/2004 |
| CN | 107104795 | A | 8/2017 |

(Continued)

*Primary Examiner* — Ario Etienne
*Assistant Examiner* — Mohammad Yousuf A. Mian
(74) *Attorney, Agent, or Firm* — Laurence A. Greenberg; Werner H. Stemer; Ralph E. Locher

(57) ABSTRACT

A method for producing a control device includes the following steps: generating, by the control device, a first asymmetric cryptographic key pair with a first private key and a first public key; transmitting the first public key to an external entity; generating, by the external entity, a second asymmetric cryptographic key pair with a second private key and a second public key; encrypting, by the external entity, the second private key using the first public key; transmitting the encrypted second private key from the external entity to the control device; and decrypting, by the control device, the encrypted second private key using the first private key.

11 Claims, 3 Drawing Sheets

(56) References Cited

U.S. PATENT DOCUMENTS

| | | | | |
|---|---|---|---|---|
| 2020/0366506 | A1 * | 11/2020 | Brockhaus | H04L 63/0823 |
| 2023/0239202 | A1 * | 7/2023 | Li | H04L 63/08 709/220 |

FOREIGN PATENT DOCUMENTS

| | | | | | |
|---|---|---|---|---|---|
| CN | 107911370 | A | | 4/2018 | |
| CN | 107104795 | B | * | 9/2020 | H04L 9/0825 |
| DE | 102018211372 | A1 | | 1/2020 | |
| EP | 3518159 | A1 | | 7/2019 | |

* cited by examiner

PREPARATION OF A CONTROL DEVICE FOR SECURE COMMUNICATION

FIELD AND BACKGROUND OF THE INVENTION

The invention relates to a control apparatus, by way of example for controlling an IoT appliance. In particular, the invention relates to the preparation of the control apparatus for cryptographically protected communication with a predetermined entity.

In the internet of things (IoT), a multiplicity of controllable appliances is communicatively networked with one another. By way of example, appliances that are provided for use by end consumers are to communicate with a central entity. The appliances can transmit information regarding their operating status to the central entity and, on the basis of the multiplicity of items of information received, the central entity can influence the control of the appliance. By way of example, the control can be configured per software update so as to perform an additional service, an existing service can be improved or a location-independent use of a service by the appliance can be taken over by a further appliance.

During communication between an appliance and a central entity, it is critical that transmitted information cannot be intercepted or falsified and that the communication partners can be sure that the respective other entity is the entity they are claiming to be. This can be achieved using asymmetrical cryptography, whereby each participant has a private key and a corresponding public cryptographic key. An item of information that has been encrypted using the one key can only be decrypted again using the other key. Identities can be secured by relevant information being digitally signed by a certification authority.

In order to use asymmetric cryptography, the IoT appliance must be equipped within the scope of its manufacture with a public key and a private key. In the case of appliances being mass-produced, it is not always possible to guarantee that a private key that is generated for a particular appliance is loaded exclusively into this appliance and is protected against unauthorized access.

SUMMARY OF THE INVENTION

One object forming the basis of the present invention is to provide improved technology for equipping an appliance with cryptographic keys for secure communication. The invention achieves this object by means of the subjects of the independent claims. Subordinate claims disclose preferred embodiments.

According to a first aspect of the present invention, a method for manufacturing a control apparatus comprises steps of generating, by the control apparatus, a first asymmetric cryptographic key pair having a first private key and a first public key; transmitting the first public key to an external entity; generating, by the external entity, a second asymmetric cryptographic key pair having a second private key and a second public key; encrypting, by the external entity, the second private key using the first public key; transmitting the encrypted second private key from the external entity to the control apparatus; and decrypting, by the control apparatus, the encrypted second private key using the first private key.

The control apparatus can be provided in a simple and secure manner with cryptographic keys without the private key leaving the control apparatus at any point in time. The private key can thus be better protected against misuse. The control apparatus can communicate in a more secure manner using the second cryptographic key. If the control apparatus is configured for controlling an appliance, in particular a household appliance, then the appliance can communicate with an external entity in a more secure manner with the result that it is possible to increase operating security and data security.

It is further proposed that the external entity issues a cryptographic certificate on the basis of the second public key and preferably also stores the cryptographic certificate on the key server. For this purpose, the external entity can provide a digital signature on the certificate. The digital signature can be performed on the basis of an issuer certificate that the external entity would provide by way of example from a root certification authority (root CA).

The cryptographic certificate can include the second public key of the control apparatus, with the result that it is possible to communicate with the control apparatus in a secure manner. In addition, the certificate can include information regarding an identity, a manufacturer of the control device or a device that is allocated to the control apparatus.

In a further embodiment, multiple second key pairs are determined by the external entity and multiple second private keys are encrypted, transmitted to the control apparatus and decrypted there. All the second private keys can be protected by means of the determined first private key for transportation to the control apparatus. The second key pairs can be provided for different services, purposes or communication partners. By way of example, separate key pairs can be provided for updating, status information, location-independent services and user information. Should one of the keys be compromised, then it is still possible to use all the other keys. In particular, it is thus possible to maintain the possibility of controlling a change of the compromised key via a secure channel.

The control apparatus can communicate in an encrypted manner with a further external entity using the second key pair. A communication of the control apparatus to the further external entity can be encrypted by the control apparatus by means of a public key of the further external entity. The public key can be obtained prior to the secure communication from a key server or directly from the communication partner. The received public key can be validated prior to use, by way of example by means of a validation service such as CRL (certificate revocation lists) or OSCP (offensive security certified professional) certification. The last non-root certificate of the PKI (public key infrastructure) is preferably stored as a trust anchor directly in the control apparatus.

The encrypted communication can be transmitted to the further external entity which can decrypt it by means of its private key. A communication from the further external entity to the control apparatus can be transmitted in a corresponding manner in the reverse direction. The asymmetric cryptographic communication can be used to exchange a cryptographic key that can be used for encrypting a subsequent communication. This cryptographic key usually has temporal limited validity and is also called a session key. In particular, the further cryptographic security can be provided by means of symmetric cryptography. This can be easier to manage and requires fewer resources.

According to a further aspect of the present invention, a control apparatus is configured for a predetermined appliance so as to generate a first asymmetric cryptographic key pair having a first private key and a first public key; to transmit the first public key to an external entity; to receive a second private key that is encrypted using the first public key, wherein the second private key is part of a second asymmetric cryptographic key pair; and to decrypt the received second private key using the first private key.

The control apparatus can directly control the appliance or can be provided as a superordinate or coordinate component in addition to a further control apparatus. The control apparatus can be configured so as to control or monitor a facility, configuration or design of the further control apparatus. In particular, it is possible to ensure that certain actions, such as equipping the further control apparatus with an operating program (firmware), are only performed by the control apparatus under cryptographic protection. By way of example, it is possible to refuse the installation of a firmware on the further control apparatus if a cryptograph signature of the firmware cannot be positively confirmed by the control apparatus.

The control apparatus can be configured so as to completely or in part perform a method described herein. For this purpose, the control apparatus can comprise a programmable microcomputer or microcontroller and the method can be in the form of a computer program product having program code means. The computer program product can also be stored on a computer-readable data carrier. Features or advantages of the method can be transferred to the control apparatus or conversely.

The control apparatus can be configured so as to control a predetermined appliance and using the first private key to encrypt an item of information that comes within the scope of the control of the appliance and to store said item of information locally. The information can include in particular a configuration, a user-controlled item of information or a communication setting.

The control apparatus can comprise an interface for communication with an external entity. The interface can use a WLAN network and a WPA2 key is required to access said WLAN network. The WPA2 key can be encrypted by means of the first private key and stored locally. In a further embodiment, it is also possible to provide a different interface, by way of example to a wire-connected network.

According to a third aspect of the present invention, a household appliance comprises a control apparatus that is described herein. The household appliance can be provided in particular for use by a, private end consumer, by way of example. The household appliance can be provided for use within a household and can include, by way of example, a kitchen appliance, a garden appliance, an electric tool, an illuminating facility, a controller for use in household technology or a floor cleaning appliance.

According to a fourth aspect of the present invention, an external entity for a control apparatus, wherein the external entity is configured so as to receive a first public key from the control apparatus, wherein the first public key is part of a first cryptographic key pair; to generate a second asymmetric cryptographic key pair having a second private key and a second public key; to encrypt the second private key using the first public key; and to transmit the encrypted second private key to the control apparatus.

The external entity is external to a control apparatus described herein and is usually used within the scope of manufacture or production of the control apparatus. The external entity is usually cryptographically secured and can also be especially secured at system level in order to ensure that an unauthorized person does not change a function or setting or that the external entity is not used for a purpose other than an intended purpose. In particular, the external entity may be located at a manufacturer or producer of control apparatuses and used so as to equip produced control apparatuses for secure communication. For this purpose, the control apparatus can be provided in particular with an asymmetric cryptographic key pair, as described herein.

The external entity can be configured for direct communication with the control apparatus or it is possible to provide an intermediate component that handles communication between the control apparatus and the external site. The intermediate component then preferably functions on a communication layer which forwards the encrypted information unchanged between the control apparatus and the external site. By way of example, the intermediate component can be equipped with a serial interface for communication with the control apparatus and/or said intermediate component can be equipped with a USB port or Ethernet port for communication with the external entity.

BRIEF DESCRIPTION OF THE FIGURES

The invention is now described in more detail with reference to the attached figures, in which.

DETAILED DESCRIPTION OF THE INVENTION

Figure 1:
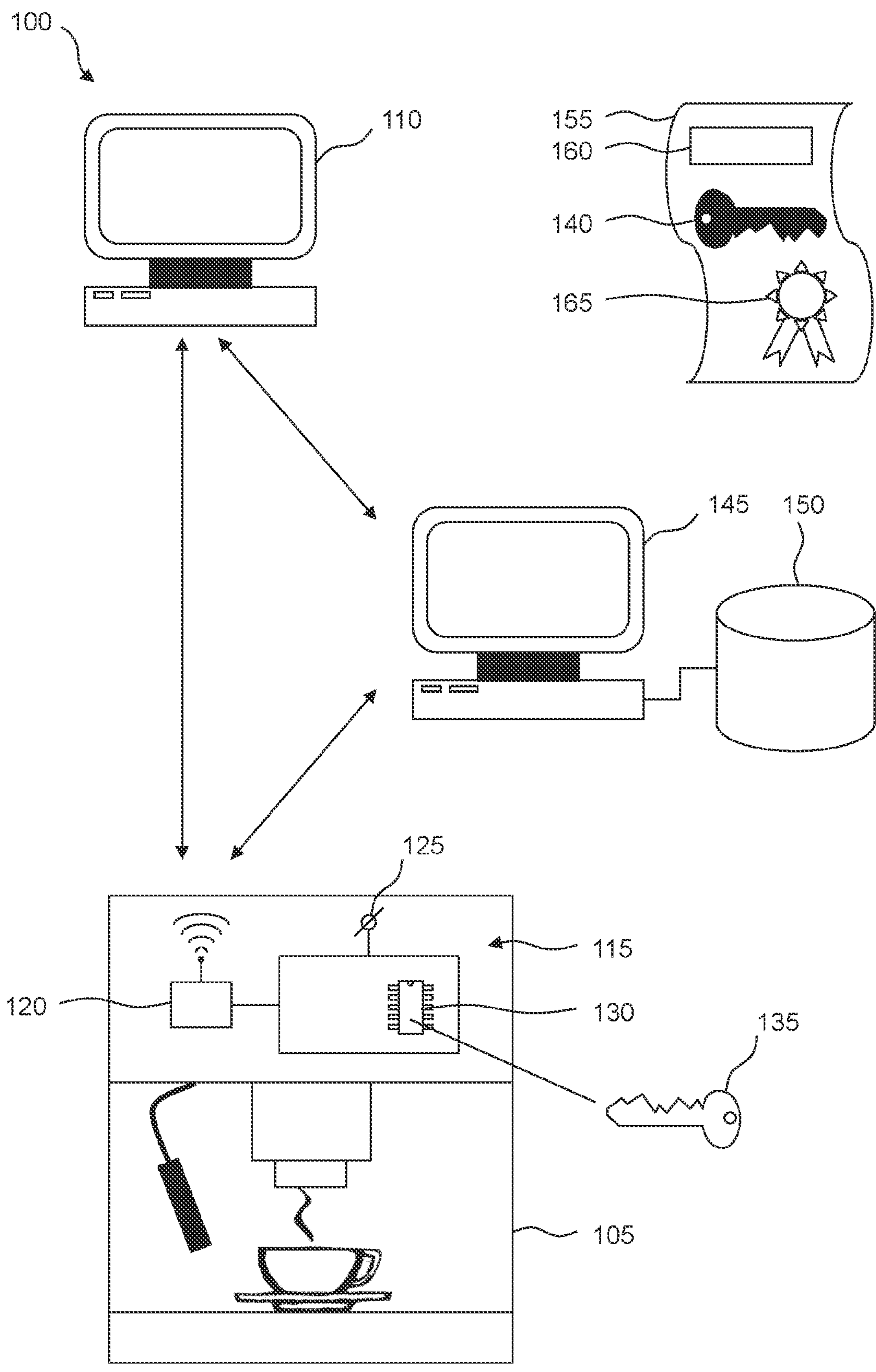
FIG. 1 shows a household appliance

FIG. 1 illustrates an exemplary first system 100 having an appliance 105, in particular a household appliance 105, that is illustrated in an exemplary manner as a coffee machine, but in principle can also include any other appliance. The appliance 105 is configured so as to communicate with the server 110, by way of example, in order to use or render possible a service that is based on the evaluation of user information of a multiplicity of appliances 105.

The appliance 105 comprises a control apparatus 115 that can be configured so as to directly control the appliance 105 or to control a component which controls the appliance 105. The control apparatus 115 comprises in the illustrated embodiment a communication facility 120 that can use in particular a wireless network, by way of example a WLAN network or a mobile radio network, moreover an interface 125 and a storage device 130. The interface 125 is configured so as to communicate with an external component, as is described in more detail herein. The interface 125 is usually used exclusively within the scope of manufacture or production of the control apparatus 115. Optionally, the interface 125 can be configured so as to render communication possible in the event of servicing. The storage device 130 is preferably configured so as to receive or store information only in an encrypted form. Access to the information, reading or writing, can be limited to the control apparatus 115.

The server 110 is representative for any communication partner with which the appliance 105, or the control apparatus 115, is to communicate. Usually, the server 110 is formed by a computer or by a computer system, that is configured so as to communication with a multiplicity of appliances 105.

Asymmetric cryptography is used in order to secure the communication between the control apparatus 115 and the server 110. This is outlined below in its principles for transmitting information from the control apparatus 115 to the server 110. A person skilled in the art takes the usual highlights, limitations or details from their habitual expertise.

The control apparatus 115 is allocated a cryptographic key pair that comprises a private key 135 and a public key 140. The keys are complementary to one another, with the result that a predetermined cryptographic operation using one of the keys 135, 140, can be reversed by another operation by means of the respective other key 135, 140. The private key 135 is preferably only accessible for the control apparatus 115 and is to be kept secret. In contrast, the public key 140 does not form a secret that is to be protected and can be made known in any form. By way of example, a key server 145 can be provided that can make available a multiplicity of public keys 140 in a data storage device 150. Access to the key server 145 can be reserved for a predetermined user group or the key server 145 is public and can be used by anybody.

The public key 140 of the control apparatus 105 is preferably part of a certificate 155 that is made available by the key server 145. The certificate 155 can include information 160 regarding the control apparatus 105, by way of example a designation of the control apparatus 105 or of the allocated appliance 105, a design, a manufacturer or a production date. The certificate 155 usually includes moreover a signature 165 that protects the contents that are included. The signature 165 can be formed in such a manner that a type of fingerprint is determined for all the content by means of a cryptographic hash function, which is usually encrypted by means of a private key of a certificate authority (CA). A public key of the CA is usually known to all communication participants, with the result that the unencrypted coefficient of variance can be determined and can be compared with a coefficient of variance regarding the information that is included. If the coefficients of variance match, it is then possible to regard the certificate 155 as valid.

An item of information that is to be transmitted by the control apparatus 105 to the server 110 can be encrypted by the control apparatus 105 by means of the public key of the server 110 and sent to the server 110. The control apparatus 105 can obtain the public key from the key server 145. The server 110 can decrypt the communication again with the aid of its private key.

In order to ensure secure communication between the communication partners 105, 110, it is necessary to guarantee that a private key 135 is exclusively accessible to the allocated partner. A technology is presented herein, whereby the control apparatus 115 is equipped within the scope of its production with a private key 135 without a person who is entrusted with generating a key, by way of example an electronics producer, being awarded access to the private key.

Figure 2:
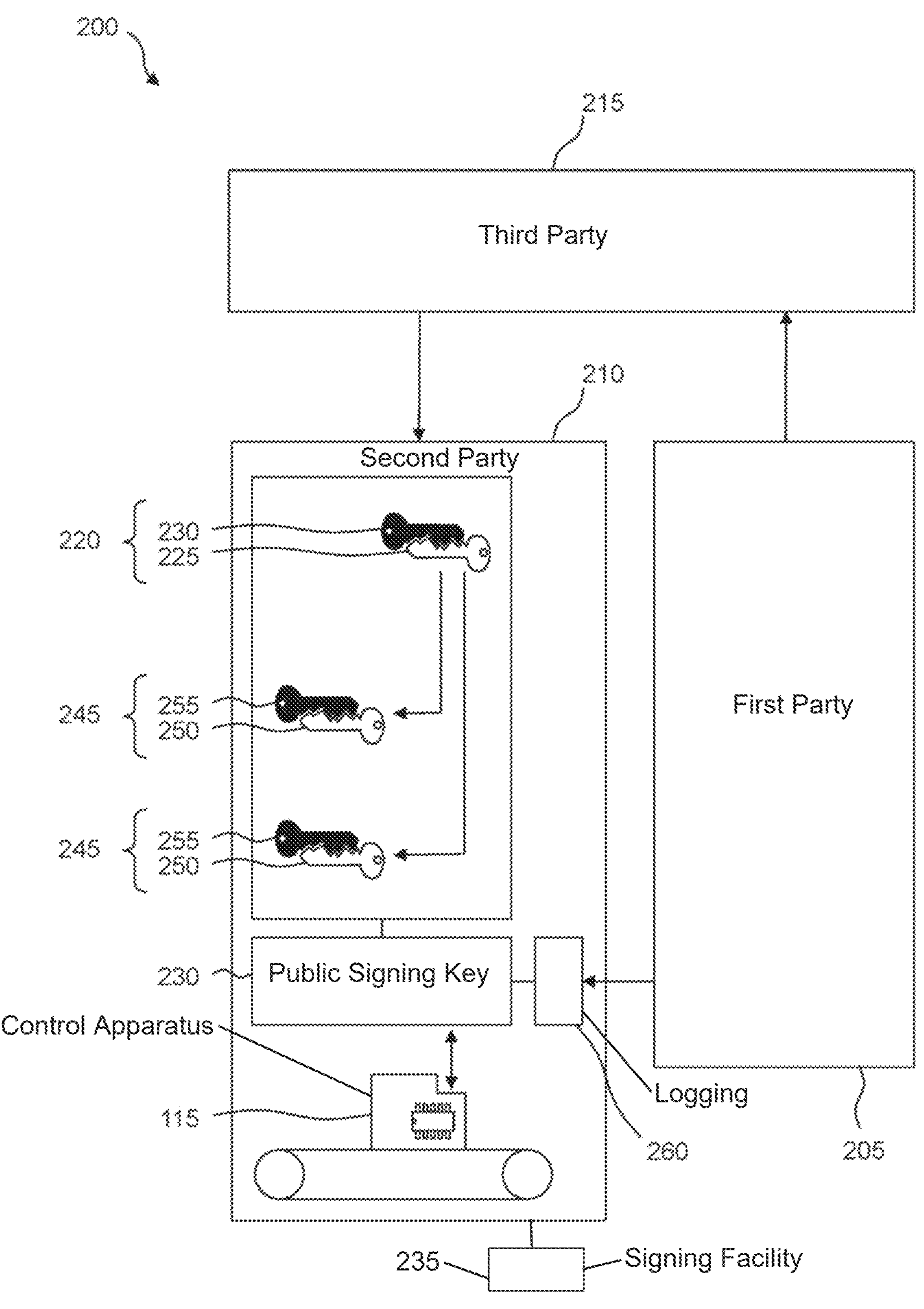
FIG. 2 shows a system.

FIG. 2 shows an exemplary second system 200 which illustrates a manufacturing process of a control apparatus 115. A first party 205 can authorize a second party 210 to manufacture the control apparatus 115. The first party 205 can include a manufacturer of appliances 105, and the second party 210 can include a manufacturer of control apparatuses 115. Usually, the manufacturer of a plurality of control apparatuses 115 is authorized and the control apparatuses 115 are mass-produced. Prior to the control apparatus 115 being delivered, it is to be provided with an individual key pair for asymmetric cryptographic communication. In order to create suitable key pairs, the first party 205 can request from a third party 215 signing keys 220 that are usually configured so as to sign a predetermined number of certificates 155 or to process corresponding signing requests. The third party 215 can include in particular a root certification authority.

The signing key 220 comprises a private signing key 225 and a public signing key 230 wherein the latter can be in the form of a certificate 155 that is signed by the second party 210. The signing key 220, in particular the private signing key 225, is usually protected during transportation in a particular manner. By way of example, a signing facility 235 can be physically delivered to the third party 215, provided there with the signing key pair 225 and then transported to the second party 210. In so doing, the signing facility 235 can be transferred into a special transportation mode which can prevent use and in particular can prevent access to information that is included. The transportation mode can be created using cryptographic means and cancelled again at the location of the second party 210.

In the case of the second party 210, a functionable control apparatus 115 that is not yet equipped with cryptographic keys can be connected by means of an intermediate component or directly to the signing facility 235. The control apparatus 115 can then generate a first cryptographic key pair and the public key 140 of said first cryptographic key pair is transmitted to the signing facility 235. The signing facility 235 can then make available a second cryptographic communication key pair 245 having a private communication key 250 and a public communication key 255 and sign the latter with the aid of the signing key pair 220. In order to create the communication key pair 245, the signing facility 235 has at its disposal high value hardware. In particular, a randomizer which can be required for creating a cryptographically secure key can make available random data of a high quality and with sufficient speed. The generated private communication key 250 can be encrypted by means of the previously received public key 140 and transmitted to the control apparatus 115. The single entity that has at its disposal the private key 135 and can consequently decrypt the private communication key 250 is the control apparatus 115. Apart from the originally generated keys 135, 140, the control apparatus 115 then also has the communication key 245 and can use this for communication with an external server, such as is explained by way of example above with reference to FIG. 1.

Usually, multiple communication key pairs 245 are generated for the control facility 115 and transmitted to said control facility in the manner described secured by the keys 135, 140 to the control apparatus 115. The transmission of communication keys 245 to a control apparatus 115 can be detected by means of logging 260 and transmitted to the first party 205. It is thus possible in particular to follow whether a number of produced control apparatuses 115 corresponds to a number of distributed communication key pairs 245.

Figure 3:
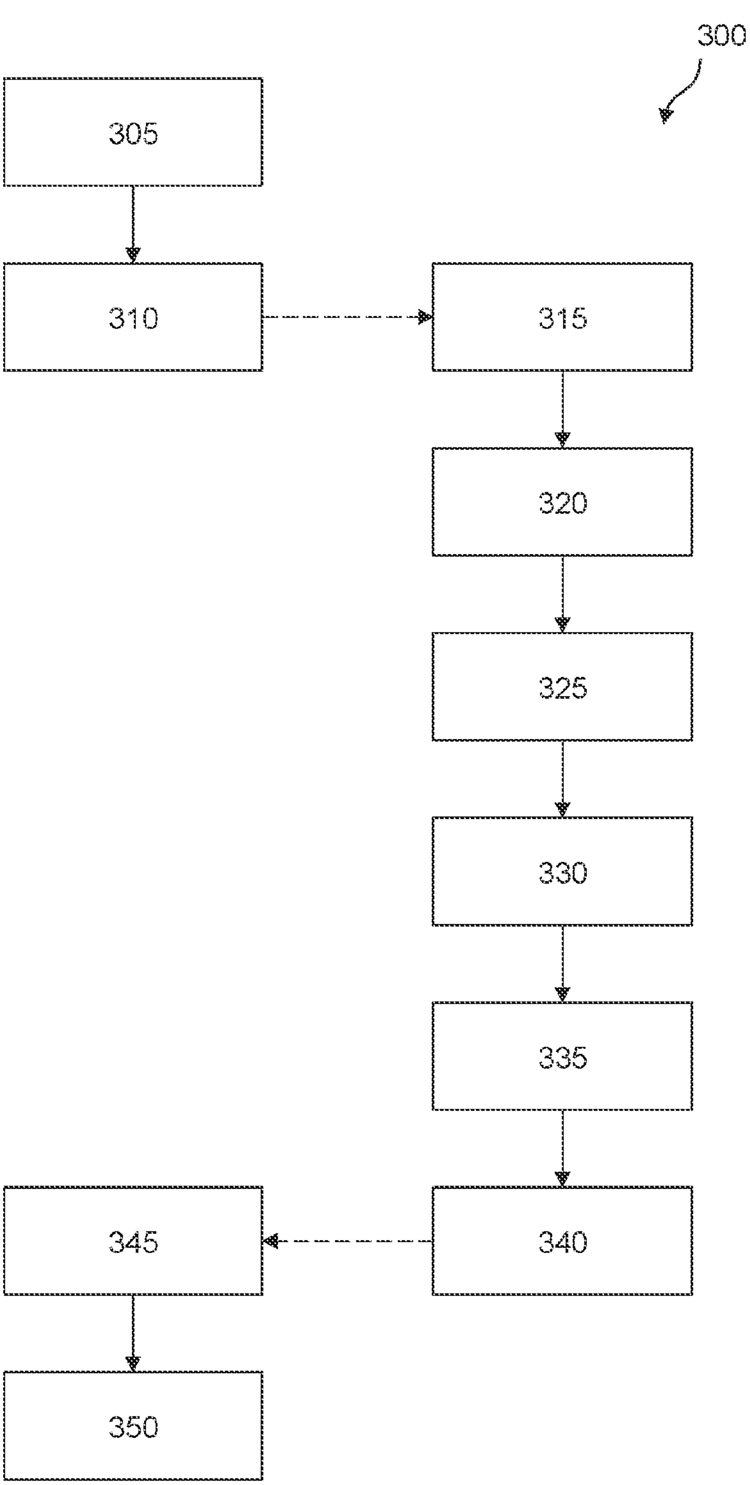
FIG. 3 shows a flow diagram of a method.

FIG. 3 illustrates a flow diagram of a method 300 that can be performed by way of example in a system 200 in order to equip a control apparatus 115 with cryptographic communication keys 245. Steps that are indicated on the left hand side of the illustration are allocated to the control apparatus 115 and steps that are indicated on the right hand side of the illustration are allocated to the signing facility 235.

In a step 305, the control apparatus 115 generates a first key pair having the private key 135 and the public key 140. In a step 310, the control apparatus 115 can send the public key 140 to the signing facility 235 and this can receive the key 140 in a step 315.

In a step 320, the signing facility 235 can certify the received public key 140. The signing facility 235 can for this purpose process a certification request of the control apparatus 115. In a step 325, a communication key pair 245 having a private communication key 250 and a public communication key 255 can be generated.

In a step 330, the signing facility 235 can encrypt the generated private communication key 250 by means of the previously received public key 140. In the same manner, one or multiple public certificates can be encrypted that are allocated by way of example to the second party 210 or to the key server 145. This information can be sent out in a step 340 by the signing facility 235 and be received in a step 345 by the control apparatus 115.

In a step 350, the control apparatus 115 can decrypt the received information again by means of its initially generated private key 135 and is now able to communicate on the basis of the communication key 245.

LIST OF REFERENCE CHARACTERS

100 System
105 Appliance, household appliance
110 Server
115 Control apparatus
120 Communication facility
125 Interface
130 Storage device
135 (First) private key
140 (First) public key
145 Key server
150 Data storage device
155 Certificate
160 Information
165 Signature
200 System
205 First party (appliance manufacturer)
210 Second party (producer of control apparatuses)
215 Third party (certification authority)
220 Signing key pair
225 Private signing key
230 Public signing key
235 Signing facility
245 Communication key pair
250 Private communication key
255 Public communication key
260 Logging
300 Method
305 Generate first key pair
310 Transmit public key
315 Receive public key
320 Certify public key
325 Generate second key pair
330 Encrypt second private key
335 Encrypt public certificate
340 Transmit
345 Receive
350 Decrypt

The invention claimed is:

1. A method for equipping a control apparatus including a programmable microcomputer or microcontroller circuit with cryptographic keys, the method comprising the following steps:

generating, by the control apparatus, a first asymmetric cryptographic key pair having a first private key and a first public key;

transmitting the first public key, which was generated by the control apparatus, from the control apparatus to an external signing entity;

generating, by the external signing entity, a second asymmetric cryptographic key pair having a second private key and a second public key, and signing the second public key using a signing key pair;

encrypting, by the external signing entity, the second private key with the first public key;

transmitting the encrypted second private key from the external signing entity to the control apparatus; and decrypting, by the control apparatus, the encrypted second private key with the first private key;

wherein the control apparatus uses the second asymmetric cryptographic key pair for communication with an external server.

2. The method according to claim 1, which comprises creating, by the external signing entity, a cryptographic certificate based on the second public key and storing the cryptographic certificate on a key server.

3. The method according to claim 1, which comprises determining multiple second key pairs by the external signing entity, encrypting and transmitting multiple second private keys to the control apparatus, and decrypting the multiple second private keys by the control apparatus.

4. The method according to claim 1, which comprises establishing encrypted communication between the control apparatus and a further external entity using the second key pair.

5. The method according to claim 1, wherein only the control apparatus is able to decrypt the encrypted second private key using the first private key.

6. A control apparatus for a predetermined appliance, the control apparatus including a programmable microcomputer or microcontroller circuit configured to:

generate a first asymmetric cryptographic key pair having a first private key and a first public key;

transmit the first public key, which was generated by the control apparatus, to an external signing entity that generates a second asymmetric cryptographic key pair having a second private key and a second public key and that signs the second public key using a signing key pair;

receive the second private key that is encrypted using the first public key, the second private key being a part of the second asymmetric cryptographic key pair;

decrypt the second private key using the first private key; and use the second asymmetric cryptographic key pair for communication with an external server.

7. The control apparatus according to claim 6, further comprising an interface for communication with the external signing entity.

8. The control apparatus according to claim 6, configured to control the predetermined appliance and to use the first private key for encrypting an item of information related to controlling the appliance and to store the item of information locally.

9. A household appliance, comprising a control apparatus according to claim 6.

10. An external signing entity for a control apparatus including a programmable microcomputer or microcontroller circuit, the external signing entity comprising a processor configured to:

receive a first public key from the control apparatus, the first public key being a part of a first cryptographic key pair;

generate a second asymmetric cryptographic key pair having a second private key and a second public key, and sign the second public key using a signing key pair;

encrypt the second private key using the first public key; and transmit the encrypted second private key to the control apparatus to use the second asymmetric cryptographic key pair for communication with an external server.

11. A system, comprising: the external signing entity according to claim 10, and a device with a control apparatus for a predetermined appliance;

the control apparatus including a programmable microcomputer or microcontroller circuit configured to:

generate a first asymmetric cryptographic key pair having a first private key and a first public key;

transmit the first public key to the external signing entity that generates a second asymmetric cryptographic key pair having a second private key and a second public key and signs the second public key using a signing key pair;

receive the second private key that is encrypted using the first public key, the second private key being a part of the second asymmetric cryptographic key pair; and decrypt the second private key using the first private key; and use the second asymmetric cryptographic key pair for communication with an external server.

* * * * *